Nov. 24, 1936.                J. E. GUY                2,061,623
                            FOLDING VEHICLE
                      Original Filed Jan. 27, 1934
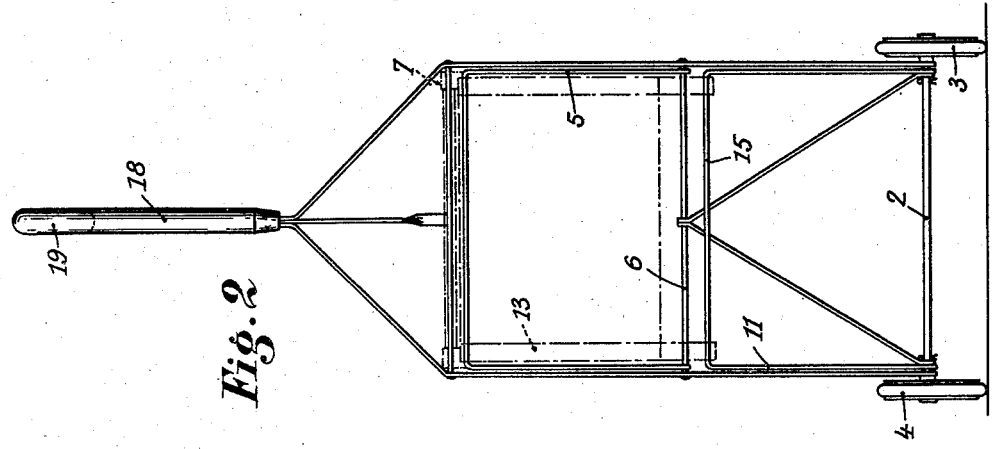
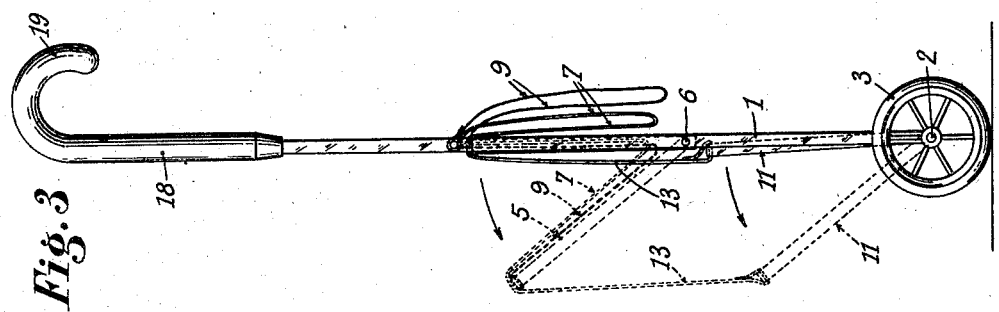
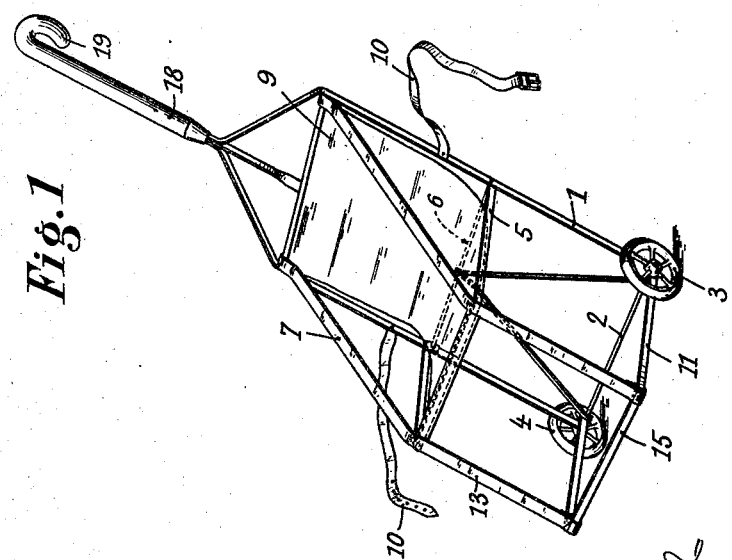

Patented Nov. 24, 1936

2,061,623

UNITED STATES PATENT OFFICE 2,061,623

FOLDING VEHICLE

Jean Emile Guy, Ville d'Avray, France

Application January 27, 1934, Serial No. 708,592. Renewed October 6, 1936. In France December 11, 1933

2 Claims. (Cl. 280—36)

My invention relates to folding carriages of the type that is more especially adapted to be utilized as a perambulator for babies, or as a wheeled support for a bag.

The object of my invention is to provide a vehicle of this kind which is of very light weight, occupies very little room when it is folded, and can therefore be carried without difficulty, even in places where the room is limited, for instance in public conveyances.

According to my invention, the vehicle comprises a frame, preferably of plane or flat shape, provided at its lower part with two wheels the common axis of which is located in said plane, a support pivoted to said frame about a spindle carried by it, so that said support can be folded against said frame, and at least one strap, or the like, adapted to maintain said support in a position substantially at right angles to said frame when said support is in the working position.

The frame is provided at its upper part with any suitable handle, consisting preferably of a curved stick or rod permitting either to carry the vehicle, when it is folded, or to push or pull it, when it is in the working position.

The portion of the frame located above said support, and also said support itself, are so arranged as to prevent what they are intended to carry from passing through them. Preferably, for this purpose, they are provided with a piece of canvas, either stretched in each of these parts or fixed at one end to the upper part of the frame and at the other end to the free end of the support.

Finally, I may also provide a second frame parallel to said support and pivoted to said first mentioned frame, in such manner that it may be folded into the first mentioned frame. The front part of this second frame is intended to act as a foot rest for the child that is seated on the support. Said support and said second frame are preferably connected together by straps or the equivalent so that their corresponding lateral sides form parallel links both pivoted to the first mentioned frame.

I may also provide means (pawls or the like) for locking the second mentioned frame in its working position, whereby the vehicle is able to remain in equilibrium in an upright position when no longer supported by the handle.

Other features of my invention will result from the following detailed description thereof.

A preferred embodiment of my invention will be hereinafter described with reference to the accompanying drawing, given merely by way of example, and in which:

Fig. 1 is a perspective view of the folding carriage in the working position;

Fig. 2 is a front view of the vehicle in the folded position;

Fig. 3 is a side view corresponding to Fig. 2, showing in dotted lines the position of the parts when they are being unfolded.

According to the embodiment of my invention shown in the drawing, the vehicle comprises a main frame 1 provided at its lower end with an axle 2 carrying wheels 3 and 4. A support 5 consists, in the embodiment illustrated by the drawing, of a flat bar bent to form with the transverse spindle 6 a rectangular frame carried by the main frame 1. This support 5 can pivot with respect to frame 1 about spindle 6 and its movement in a downward direction is limited by straps 7 or equivalent means. The upper portion of frame 1 and support 5 carry a piece of canvas 9 forming the seat of the vehicle. A strap 10 is adapted to secure the baby to said seat.

A second frame 11 is pivoted about axle 2 and is connected to support 5 through straps 13 or the like. The front bar 15 of this second frame acts as a foot rest for the baby, as shown in Fig. 1. A pawl or similar device, not shown in the drawing, makes it possible to lock frame 11 with respect to frame 1 in the open position, so that the vehicle can remain in equilibrium in an upright position, rod 15 resting on the ground.

The width of support 5 and frame 11 is preferably smaller than that of frame 1 and the length of frame 11 is smaller than the distance between axle 2 and spindle 6, so that, as shown in Figs. 3 and 4, both support 5 and frame 11 can be folded into frame 1, the whole being then of relatively small thickness and occupying very little room. Strap 10 may be used for keeping the whole in the closed position.

Frame 1 is provided at its upper part with a rod 18 the upper end of which forms a handle 19 through which it is possible either to push the vehicle (Fig. 1) or to carry it when it is folded, as a walking stick or an umbrella.

Fig. 5 shows a bag 20 provided with a strap 21 adapted to be engaged around frame 1 and intended to rest on support 5, as shown in Fig. 6. This arrangement is very useful for carrying parcels, marketing, etc.

While I have described what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. A folding carriage which comprises in combination a main flat frame, an axle at the lower part of said frame, two wheels carried by said axle, one at each end thereof, at least one bar adapted to form with said axle a rectangular frame pivoted about said axle, the outer width of said rectangular frame being slightly less than the inner width of said flat frame, a spindle carried by said flat frame, the distance between said axle and said spindle being slightly greater than the length of said rectangular frame so that said latter can be folded into said flat frame, at least a bar adapted to form with said spindle a second rectangular frame pivoted about said spindle, the outer width of said second rectangular frame being slightly less than the inner width of said flat frame so that said second frame can be folded into said flat frame, a piece of canvas fixed at one end to the upper part of said flat frame and at the other end to the front part of said second rectangular frame, so as to form a seat, and two straps, one at each corner of the flat frame, between the upper part of said flat frame and said rectangular frame for limiting the angular displacements of said last named frame in a downward direction, and a handle fixed to the upper part of the vehicle.

2. A folding carriage as claimed in claim 1 wherein said handle provides at its end a grip disposed in a plane substantially parallel to said wheels.

JEAN EMILE GUY.